United States Patent [19]
Waldmann

[11] 3,929,854
[45] *Dec. 30, 1975

[54] BUNTE SALTS CONTAINING FLUORO-ALKYL GROUPS

[75] Inventor: Karl Waldmann, Frankfurt am Main, Germany

[73] Assignee: Hoechst Aktiengesellschaft, Frankfurt, Germany

[ * ] Notice: The portion of the term of this patent subsequent to Oct. 1, 1991, has been disclaimed.

[22] Filed: June 28, 1974

[21] Appl. No.: 484,161

Related U.S. Application Data

[62] Division of Ser. No. 238,524, March 27, 1972, Pat. No. 3,839,417.

[30] Foreign Application Priority Data

Mar. 29, 1971 Germany........................... 2115140

[52] U.S. Cl. ............................................... 260/458
[51] Int. Cl.² ........................................ C07C 141/02
[58] Field of Search ............ 260/456 R, 458, 458 F

[56] References Cited
UNITED STATES PATENTS

| | | | |
|---|---|---|---|
| 2,157,362 | 5/1939 | Ulrich et al.......................... | 260/100 |
| 2,218,660 | 10/1940 | Schowalter et al. ............. | 260/513 R |
| 2,764,603 | 9/1956 | Ahlbrecht....................... | 260/404.5 |
| 3,238,235 | 3/1966 | Hauptschein et al............... | 260/404 |
| 3,335,163 | 8/1967 | Tesoro et al......................... | 260/458 |
| 3,721,706 | 3/1973 | Hoffmann et al............... | 260/501.12 |
| 3,798,265 | 3/1974 | Bartlett........................... | 260/513 N |

*Primary Examiner*—James O. Thomas, Jr.
*Assistant Examiner*—Nicky Chan
*Attorney, Agent, or Firm*—Connolly and Hutz

[57] ABSTRACT

Compounds of the formula

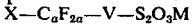
$$X-C_aF_{2a}-V-S_2O_3M$$

in which X represents a hydrogen or a fluorine atom, a represents a number of 4 to 14, V represents a bivalent aliphatic or aliphatic-aromatic radical which contains at least one, but not more than a methylene groups and which does not contain in terminal position related to the thiosulfato radical, and ethylene group activated by a sulfonyl or carbonyl group, and M represents a monovalent cation, and process for preparing them, which are suitable as emulsifiers in the preparation of fluorinecontaining aqueous polymer dispersions of acrylic acid derivatives. The polymer dispersion prepared with these emulsifiers can be applied with advantage onto textile substrates, onto porous materials as wood, paper or leather, ceramic masses, concrete and similar materials yielding very good oleophobic finishings of a high resistance to washing and a good soil-release behaviour.

6 Claims, No Drawings

BUNTE SALTS CONTAINING FLUORO-ALKYL GROUPS

This application is a division of application Ser. No. 238,524, filed Mar. 27, 1972, now U.S. Pat. No. 3,839,417.

It is known to polymerize monomer fluorine-containing acrylic acid derivatives in an aqueous dispersion in the presence of cationic, anionic or non-ionic emulsifiers. The term "aqueous dispersion" is to be understood in such a manner that the polymer dispersion may contain organic solvents but that it must be dilutable with water to a large extent. Though they have advantages, these aqueous dispersions, however, also have a number of disadvantages. Oleophobic finishes prepared with the use of aqueous polymer dispersions produced with cationic emulsifiers show a distinct soiling in wet state, i.e., they are very easily taking-up anionically dispersed oily dirt, for example that which is present in washing lyes. When using dispersions prepared with the use of anionic or non-ionic emulsifiers, the oleophobic finishes have the disadvantage of being less resistant to washing.

U.S. Pat. No. 3,406,004 describes compounds of the general formula $$R_f - CH_2 - O - (CH_2)_n - S[O]_b - CH_2CH_2 - $$
$$\quad\quad\quad\quad\quad\quad\quad\quad\quad\quad SSO_3M$$

in which $R_f$ represents a fluoro-alkyl radical having 3 to 14 carbon atoms and $n$ and $b$ represent the numbers 0, 1 or 2, $b$ being 2 if $n$ is 0, and M stands for an alkali metal cation or an ammonium ion. The compounds in which $b$ is 2 can be easily converted in an alkaline medium into the corresponding vinyl compounds of the general formula $$R_f - CH_2 - O - (CH_2)_n - SO_2 - CH = CH_2$$

in which $R_f$ and $n$ have the meanings given above. By reason of their reactivity towards C — H acid groups and the capability of the vinyl group to polymerize, these compounds are suitable, according to the indications given in U.S. Pat. No. 3,406,002, for the hydrophobic and oleophobic finishing of polymer materials, especially of those which contain the hydroxy group. However, owing to their sensitivity to alkalis, these known compounds are not suitable as dispersing auxiliaries in the emulsion polymerization in the alkaline pH-range.

Thus, the present invention was based on the task to find polymer dispersions for oleophobic textile finishes which have a lower sensitivity to anionically dispersed dirt and an optimum resistance to washing. These polymer dispersions are prepared with the use of special dispersing auxiliaries.

Accordingly, the present invention provides compounds of the formuls (I)

$$X-C_aF_{2a}-V-S_2O_3M \quad\quad\quad (I)$$

in which X represents a hydrogen or a fluorine atom, $a$ represents a number of 4 to 14, V represents a bivalent aliphatic or aliphatic-aromatic radical which contains at least one, but not more than $a$ methylene groups and which does not contain, in terminal position related to the thiosulfato radical, an ethylene group activated by a sulfonyl or carbonyl group, and M represents a monovalent cation; furthermore, the invention relates to a process for preparing these compounds and to their use as emulsifiers in the preparation of fluorine-containing aqueous polymer dispersions of acrylic acid derivatives.

It is preferred to use compounds of the Formula I, in which V represents a bivalent radical which contains in a variable sequence one or several identical and/or different binding members of the following formulae:

$$-A-, -O-, -Z-, -NR-$$

in which A represents a, preferably lower, alkylene radical, a lower hydroxy-alkylene radical or an arylene radical of the benzene series, Z represents a carbonyl or sulfonyl group and R represents a hydrogen atom or a lower alkyl group containing 1 to 4 carbon atoms, the individual members being so arranged that no ethylene group activated by a sulfonyl or carbonyl group is standing in the terminal position to the thiosulfato group.

There are used, in particular, compounds of the Formula I in which the radical V contains, once or several times, in a straight chain and in variable sequence, one or several linking members of the formulae $-CHR'-$, $-CHOH-$,

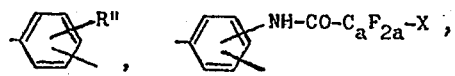

$-O-$, $-CO-$, $-SO_2-$ and $-NR-$ in which R' and R'' represent a hydrogen atom or a lower alkyl group, and R, X and $a$ have the meanings given above. A preferred arrangement of the binding members of the radical V is illustrated by the formula $$-(CHR')_b-(O)_c-(Z)_d-(NR)_e-(W)_f-(CH_2)_g-$$

in which $b$ is 0, 1 or 2, $c$, $d$, $e$ and $f$ are 0, 1 or 2, $g$ is a number of 1 to 12, preferably 1 or 2, and Z, R and R' have the meanings given above and in which W represents a group of the formula $-CH_2CH_2O-$, $-CH_2CHOH-$, $-CH_2CH_2-O-CO-NH-$, or

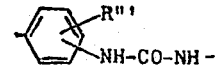

or $-SO_2-$ (except if $g = 2$) or $-CO-$ (except if $g = 2$), R''' standing for a methyl group or a group of the formula $NH-CO-C_aF_{2a}X$, wherein $a$ and X have the meaning given above, especially those in which $e = 1$, $f = 0$ and $g = 2$.

The index number $a$ may be a whole number; on the other hand, it is also possible and often required in the manufacturing process or even of advantage that $a$ represents a broken number, i.e., that there are used mixtures with different integers $a$. The binding member V is preferably composed of the following bivalent radicals; 1 – 12, preferably 1, 2, 3 or 4 $CH_2$—groups; 0 – 4, preferably 0, 1, 2 or 3 NR—groups, which may contain identical or different radicals R, R preferably being a hydrogen atom or a methyl, ethyl or propyl group; 0 – 4, preferably 0, 1 or 2 CO—groups; 0 – 2, preferably 0 or 1 $SO_2$—group; 0 – 4, preferably 0, 1 or 2 O—atoms; 0 or 1 phenyl group which may be substituted by a lower alkyl radical, preferably the methyl or ethyl group, and/or by a fluorinated radical; 0 – 2, preferably 1 CHOH—group.

For reasons of solubility and of easy manufacture, an alkali metal ion is preferred as the mono-valent cation M. In this respect, especially the sodium and potassium ions are used for economical reasons. If desired, these cations can be exchanged in known manner, for example against ammonium ions which may be substituted by organic radicals, for example triethanol ammonium.

The compounds of the present invention are prepared by condensing two compounds one of which containing the radical X—$C_aF_{2a}$— and the other one the radical $S_2O_3M$. For preparing the compounds of the invention, there are suitable in general all starting products which correspond to the formulae X—$C_a F_{2a}$—$V^1$ and $V^2$—$S_2O_3M$ and whose reactive groups $V^1$ and $V^2$ yield the group V upon alkylation or acylation.

Alkylating compounds are in particular halides and epoxides which carry a fluorinated alkyl radical. As acylating compounds, there are used corresponding carboxylic acid and sulfonic acid chlorides, isocyanates and carboxylic acid esters which contain the fluorinated alkyl radical either directly or bound over a bridge member.

Fluorinated alkyl halides of the mentioned kind are known in a great number, for example from U.S. Pat. No. 3,226,449. Carboxylic acid halides which carry fluoro-alkyl groups are known, for example from German Pat. No. 1,211,619 and from U.S. Pat. No. 2,519,983. Corresponding sulfonic acid halides can be obtained according to the process described in German Offenlegungsschrift 1,942,264; suitable isocyanates are described, for example in British Pat. No. 1,102,903.

It is also possible to react fluorinated alkanols as those described in German Pat. Nos. 1,214,660, and 1,106,960, and German Offenlegungsschrift 1,418,313 or U.S. Pat. No. 2,66,797, for example with phosgene or epichlorohydrin to obtain acylating or alkaylating chloroformic acid esters or chloro-hydroxypropyl ethers.

As alkylatable components which contain the Bunte salt radical, there may be used, in addition to alkali metal thiosulfates, such compounds in which the Bunte salt group is bound to a radical of the formula
—Alk—OH, in particular to a group of the formula —Alk—NR—H in which Alk represents a lower alkylene group, especially the ethylene group and R represents a hydrogen atom or a lower alkyl group. These alcohol and amine derivatives also represent in the sense of the present invention, the acylatable components which are carrying the Bunte salt radical.

The syntheses processes used for preparing the new compounds are processes known per se. Thus, the acylations are preponderantly carried out according to "Schotten-Baumann," in which process the reaction is effected in an aqueous or aqueousorganic solution in the alkaline range, using, for example, a sodium hydroxide solution or tertiary amines, such as pyridine, at temperatures in the range of between 0° and 100°C, preferably 15°C – 40°C. The acylation may also be carried out in pure solvents. The presence of organic solvents requires that the reaction partner is inert towards them. It may, therefore, be necessary in some cases also to work without water or without solvents containing hydroxyl or amine groups. As solvents there may be used water-soluble compounds or compounds which are watermiscible partly only or not at all, for example aliphatic alcohols having 1-8, preferably 1-4 carbon atoms, acetonitrile, aliphatic straight-chain or branched-chain or cyclic ketones having a total of 2-9 carbon atoms, araliphatic ketones, halogenated hydrocarbons, alkyl- and phenyl-ethers, dialkyl-carbonamides such as dimethylformamide, furthermore the aromatic compounds usually employed as solvents or solvents having a melting point below about 60°C.

The alkylating reactions are carried out at about 25°C to about 140°C, preferably at 40°C to 70°C. Temperatures exceeding 100°C are in general not necessary. A reaction under pressure is therefore necessary or advisable only if reaction partners and/or solvents having a low boiling point are used. The acylation can be effected in the neutral as well as in the alkaline range.

Accordingly, the present invention also relates to a process for preparing the new compounds of the formula I, wherein compounds of the general formula
X—$C_aF_{2a}$ — $V^1$ — T
in which X and a have the meanings given above for the formula I, $V^1$ represents a bivalent radical which contains, in variable sequence, one or several binding members corresponding to the symbols —A—, —O—, —Z— or —NR—, A standing for a preferably low molecular alkylene radical, a lower hydroxyalkylene radical or an arylene radical of the groups indicated in the introductory part as groups for the bivalent radical V, Z standing for a carbonyl or sulfonyl group and R standing for a hydrogen atom or an alkyl group of 1 – 4 carbon atoms, it being preferred that a methylene group or the radical Z is linked to T, T standing for a halogen atoms such as a fluorine, chlorine, bromine or iodine atoms, for an isocyanate or epoxydyl group, or, if $V^1$ is a carbonyl group, for an alkoxy group, preferably containing 1 – 4 carbon atoms, are reacted with compounds of the formula
$V^2$ — $S_2O_3M$
in which M has the meaning given for formula I and $v^2$ represents an alkali metal, a hydroxyalkylene or an aminoalkylene radical of the formula HRN—$(CH_2)_n$—($n = 1 - 12$), and R is an alkyl group having 1 – 4 carbon atoms.

The isolation of the new perfluoro-alkylated Bunte salt compounds from the reaction mixture is in most cases not necessary; in general, they may be used as emulsifiers in the form in which they are obtained, for example in solution, in dispersion or in suspension, in the dispersion polymerization of acrylic acid and maleic acid derivatives.

Some compounds of the invention are listed hereinafter with their formulae; the methods for preparing these compounds can be deducted by an expert from their structure. In the formulae, $R_f$ represents a fluorinated alkyl group, preferably a group corresponding to the formula X—$C_aF_{2a}$—, in which X and a have the meanings given above, in particular a perfluoro-alkyl group having 4 – 14, preferably 6 – 12, especially 6 – 10 carbon atoms, n represents the number of 1 – 12, preferably 1 or 2, and R represents a hydrogen atom or a lower alkyl group.

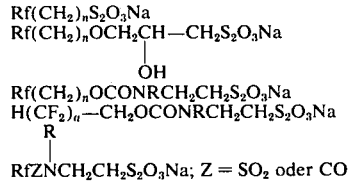

$$\text{RfSO}_2\overset{\text{R}}{\text{N}}\text{CH}_2\text{CH}_2\text{OCONRCH}_2\text{CH}_2\text{S}_2\text{O}_3\text{Na}$$

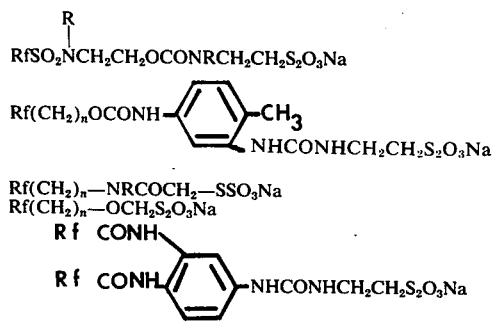

Rf(CH$_2$)$_n$—NRCOCH$_2$—SSO$_3$Na
Rf(CH$_2$)$_n$—OCH$_2$S$_2$O$_3$Na

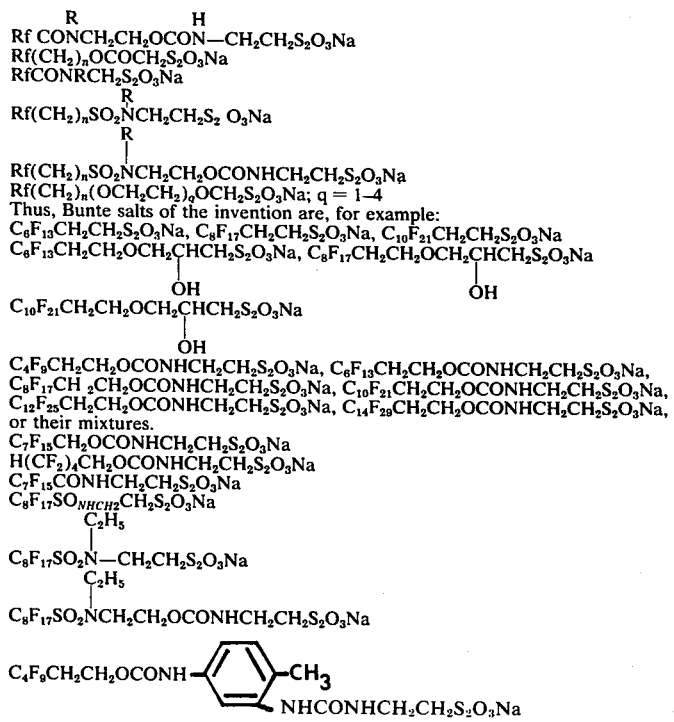

$$\text{Rf CONCH}_2\text{CH}_2\text{OCON}\overset{\text{H}}{-}\text{CH}_2\text{CH}_2\text{S}_2\text{O}_3\text{Na}$$
Rf(CH$_2$)$_n$OCOCH$_2$S$_2$O$_3$Na
RfCONRCH$_2$S$_2$O$_3$Na
$$\text{Rf(CH}_2)_n\text{SO}_2\overset{\text{R}}{\text{N}}\text{CH}_2\text{CH}_2\text{S}_2\text{O}_3\text{Na}$$
$$\text{Rf(CH}_2)_n\text{SO}_2\overset{\text{R}}{\text{N}}\text{CH}_2\text{CH}_2\text{OCONHCH}_2\text{CH}_2\text{S}_2\text{O}_3\text{Na}$$
Rf(CH$_2$)$_n$(OCH$_2$CH$_2$)$_q$OCH$_2$S$_2$O$_3$Na; q = 1–4

Thus, Bunte salts of the invention are, for example:
C$_6$F$_{13}$CH$_2$CH$_2$S$_2$O$_3$Na, C$_8$F$_{17}$CH$_2$CH$_2$S$_2$O$_3$Na, C$_{10}$F$_{21}$CH$_2$CH$_2$S$_2$O$_3$Na
$$\text{C}_6\text{F}_{13}\text{CH}_2\text{CH}_2\text{OCH}_2\underset{\text{OH}}{\text{CH}}\text{CH}_2\text{S}_2\text{O}_3\text{Na}, \quad \text{C}_8\text{F}_{17}\text{CH}_2\text{CH}_2\text{OCH}_2\underset{\text{OH}}{\text{CH}}\text{CH}_2\text{S}_2\text{O}_3\text{Na}$$
$$\text{C}_{10}\text{F}_{21}\text{CH}_2\text{CH}_2\text{OCH}_2\underset{\text{OH}}{\text{CH}}\text{CH}_2\text{S}_2\text{O}_3\text{Na}$$

C$_4$F$_9$CH$_2$CH$_2$OCONHCH$_2$CH$_2$S$_2$O$_3$Na, C$_6$F$_{13}$CH$_2$CH$_2$OCONHCH$_2$CH$_2$S$_2$O$_3$Na,
C$_8$F$_{17}$CH$_2$CH$_2$OCONHCH$_2$CH$_2$S$_2$O$_3$Na, C$_{10}$F$_{21}$CH$_2$CH$_2$OCONHCH$_2$CH$_2$S$_2$O$_3$Na,
C$_{12}$F$_{25}$CH$_2$CH$_2$OCONHCH$_2$CH$_2$S$_2$O$_3$Na, C$_{14}$F$_{29}$CH$_2$CH$_2$OCONHCH$_2$CH$_2$S$_2$O$_3$Na,
or their mixtures.
C$_7$F$_{15}$CH$_2$OCONHCH$_2$CH$_2$S$_2$O$_3$Na
H(CF$_2$)$_4$CH$_2$OCONHCH$_2$CH$_2$S$_2$O$_3$Na
C$_7$F$_{15}$CONHCH$_2$CH$_2$S$_2$O$_3$Na
C$_8$F$_{17}$SO$_{NHCH2}$CH$_2$S$_2$O$_3$Na
$$\text{C}_8\text{F}_{17}\text{SO}_2\overset{\text{C}_2\text{H}_5}{\underset{\text{C}_2\text{H}_5}{\text{N}}}-\text{CH}_2\text{CH}_2\text{S}_2\text{O}_3\text{Na}$$
$$\text{C}_8\text{F}_{17}\text{SO}_2\overset{\text{C}_2\text{H}_5}{\text{N}}\text{CH}_2\text{CH}_2\text{OCONHCH}_2\text{CH}_2\text{S}_2\text{O}_3\text{Na}$$

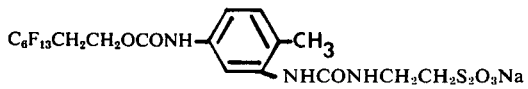

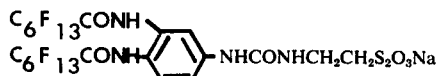

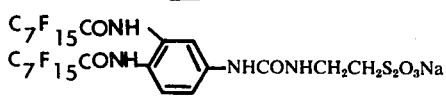

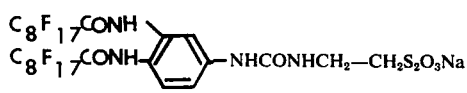

C$_7$F$_{15}$CH$_2$NHCOCH$_2$S$_2$O$_3$Na
C$_8$F$_{17}$CH$_2$CH$_2$OCH$_2$S$_2$O$_3$Na
C$_7$F$_{15}$CH$_2$OCH$_2$S$_2$O$_3$Na
C$_8$F$_{17}$CH$_2$CH$_2$OCOCH$_2$S$_2$O$_3$Na
C$_7$F$_{15}$CONHCH$_2$S$_2$O$_3$Na
$$\text{C}_8\text{F}_{17}\text{CH}_2\text{CH}_2\text{SO}_2\overset{\text{C}_2\text{H}_5}{\text{N}}\text{CH}_2\text{CH}_2\text{S}_2\text{O}_3\text{Na}$$
$$\text{C}_8\text{F}_{17}\text{CH}_2\text{CH}_2\text{SO}_2\overset{\text{C}_2\text{H}_5}{\text{N}}\text{CH}_2\text{CH}_2\text{OCONHCH}_2\text{CH}_2\text{S}_2\text{O}_3\text{Na}$$

C$_8$F$_{17}$CH$_2$CH$_2$OCH$_2$CH$_2$OCH$_2$S$_2$O$_3$Na

The compounds of the formula I are suitable as emulsifiers in the preparation of fluorine containing, aqueous polymer dispersions of acrylic acid derivatives of the general formula $$X-C_aF_{2a}-V'-CO-\underset{|}{C}=CH-Y'$$
$$\qquad\qquad\qquad\qquad Y$$

in which X and $a$ have the meanings given above, Y' represents hydrogen or the group —COOR, in which R = H or an alkyl- or fluoroalkyl group, Y represents a hydrogen or chlorine atom or a methyl or cyano group or the group —$CH_2$—COOR, in which R = H or an alkyl- or fluoroalkyl group, and V' represents a bivalent aliphatic or aliphatic-aromatic radical. Preferably, V' represents radicals of the formulae —$(CH_2)_h$—U— or
—Z—NR—$(CH_2)_i$—U— in which R and Z have the meanings given above and $h$ represents a number of 1 – 12, $i$ represents a number from 2 – 6, and U represents an oxygen or sulfur atom or a group of the formula —NR—. Particularly preferred are those radicals V' which contain 1 or 2 methylene groups.

As monomer fluorine-containing acrylic derivatives, there may be used all compounds, the emulsion or dispersion polymers of which are suitable to impart oleophobic properties onto porous materials. There may be mentioned by way of example the esters of acrylic acid, methacrylic acid, α-chloro- and α-cyano-acrylic acid and of maleic acid and itaconic acid or similar acids with alcohols having fluorinated groups; further the corresponding acid amines of the mentioned unsaturated acids which contain fluorinated groups in the amide radical. Furthermore, there may be used the corresponding derivatives of perfluorinated mercaptans.

Monomer and polymer fluorine-containing acrylic derivatives of the type mentioned above are known in a great number, for example from DAS *)1,300,677, DOS=)1,933,116, from published Dutch Patent Application 67.11506, from French Patents 1,484,541 and 1,532,284 and from British Patent 1,123,379.
*) DAS = German Auslegeschrift Good effects are also obtained when copolymerizing the fluoride-containing acrylate monomers with fluorine-free unsaturated monomers. Particular advantages may be obtained for example with acryl-imides and methylol-imides of unsaturated carboxylic acids as well as with hydroxy-alkyl- and/or epoxyalkyl esters of unsaturated acids, and with similar compounds.

The emulsion or dispersion polymerization is carried out according to methods known per se, with the modification that a Bunte salt compound of the invention is used as emulsifier. There may be added, for example, organic solvents, chaintransferring compounds, activators, protective colloids, stabilizers and buffers. For initiating the polymerization, there may be used the usual radical-forming catalysts on azo, peroxide and redox basis.

In general, the emulsifiers of the present invention are used in concentrations of from about 0.5 to about 25%, preferably 3–15%, in particular 5 – 12%, referred to the content of solid substance.

The fluorine-containing polyacrylate dispersions prepared with fluorine-containing Bunte salt compounds are not only applied with advantage onto textile substrates, but also onto other porous materials, for example wood, paper or leather, as well as on ceramic masses of any kind, for example paving tiles, plates of natural stones, concrete and similar materials.

Oleophobic finishes with aqueous polymer dispersions, produced with the use of the Bunte salt-emulsifiers of the invention have a higher resistance to washing than finishes produced with the use of polymer dispersions obtained with nonionic or other, known anionic emulsifiers. They also do not show the susceptibility to soiling as that which occurs when cationic emulsifiers were used. An additional advantage with regard to application is the good soil-release behaviour, which is very surprising in view of the fact that, in contradistinction to the known, comparable acrylate polymers, the improvement of the finishing agent prepared with the compounds of the invention is reached only by the addition of these new emulsifiers which contain perfluoroalkyl-and the Bunte salt groups.

The following examples illustrate the invention:

EXAMPLES:

A. Preparation of $R_f$-Bunte Salts:

(Parts by weight and parts by volume having the same relation as grams to ml).

1a. 15.8 Parts by weight of tetrahydro-perfluorodecyl chloroformic acid ester were added dropwise, while stirring, at room temperature together with 15 parts by volume of 2N-NaOH to a solution of 4.71 parts by weight of amino-ethanethiosulfate $H_3^+N-CH_2-CH_2-S_2O_3^-$ in 15 parts by volume of 2N-NaOH. The whole was stirred for 2 hours at room temperature. The solution which was slightly turbid when cold was evaporated on a steam bath and the residue was recrystallized from isopropanol.

$C_8F_{17}CH_2CH_2OCONHCH_2CH_2S_2O_3Na$ Melting point 130°C (dec.).

b. 27.8 Parts by weight of aminoethane-thiosulfate were dissolved in 88.5 parts by volume of 2N—NaOH. Then, 88.5 parts by volume of 2N—NaOH and 90.6 parts by weight of a mixture of chloroformic acid esters (composition: 40% by weight of $C_8F_{13}C_2H_4OCOCl$, 26.7 % of $C_8F_{17}C_2H_4OCOCl$, 16.6 % $C_{10}F_{21}C_2H_4OCOCl$, 10.3 % of $C_{12}F_{25}C_2H_4OCOCl$ and 6.4 % of $C_{14}F_{29}C_2H_4OCOCl$) were added dropwise and constantly. The whole was further stirred for 2 hours at room temperature and for ½ hour at 60°C. After cooling, 308 parts by weight of a well stirrable paste containing 38% of solid substance were obtained which was composed of:

42.3 % $C_6F_{13}CH_2CH_2OCONHCH_2CH_2S_2O_3Na$
26.5 % $C_8F_{17}CH_2CH_2OCONHCH_2CH_2S_2O_3Na$
15.8 % $C_{10}F_{21}CH_2CH_2OCONHCH_2CH_2S_2O_3Na$
9.7 % $C_{12}F_{25}CH_2CH_2OCONHCH_2CH_2S_2O_3Na$ 5.7 % $C_{14}F_{29}CH_2CH_2OCONHCH_2CH_2S_2O_3Na$

The yield was practically quantitative.

c. 9.42 Parts by weight of amino-ethane-thiosulfate $H_3^+N-CH_2CH_2-S_2O_3^-$ were introduced into 30 parts by volume of 2N—NaOH. Then, a mixture of 8.53 parts by weight of $C_6F_{13}CH_2CH_2OCOCl$, 10.53 parts by weight of $C_8F_{17}CH_2CH_2OCOCl$ and 12.53 parts by weight of $C_{10}F_{21}CH_2CH_2OCOCl$ were added dropwise, at room temperature, within about 1 hour. At the same time, 30 parts by volume of 2N—NaOH were added dropwise. The pH-value was at 10. The whole was stirred for 4 hours at room temperature and for ½ hour at 60°C. 195 Parts by weight of a paste containing 20.5% by weight of solid substance of an equimolar mixture of $C_6F_{13}CH_2CH_2OCONHCH_2CH_2S_2O_3Na$
$C_8F_{17}CH_2CH_2OCONHOH_2CH_2S_2O_3Na$
$C_{10}F_{21}CH_2CH_2OCONHCH_2CH_2S_2O_3Na$ were obtained in an almost theoretical yield. When using $C_7F_{15}CH_2OCOCl$ (prepared according to U.S. Pat. No. 2.959,611, Example 2) there was obtained the aqueous solution of $C_7F_{15}CH_2OCONHCH_2CH_2S_2O_3Na$.

d. A mixture of 29.6 parts by weight of 1,1,ω-trihydroperfluoroalkyl-chloroformic acid ester of the general formula $H(CF_2-CF_2)_nCH_2OCOCl$ ($n = 1$ to 4, 70% $n = 2$ and 12% = chlorine) and 50 parts by volume of 2N—NaOH was added dropwise, while stirring, at room temperature, within 2 hours to a solution of 15.7 parts by weight of $H_3^+N-CH_2CH_2-S_2O_3^-$ in 50 parts by volume of 2N—NaOH. The whole was stirred for 2 hours at room temperature and for ½ hour at 60°C. 142 Parts by weight of a clear, aqueous solution containing 30.8% by weight of
$H(CF_2-CF_2)_nCH_2OCONHCH_2CH_2S_2O_3Na$
were obtained.

e. 12.56 Parts by weight of $H_3^+N-CH_2CH_2-S_2O_3^-$ were dissolved in 40 parts by volume of 2N—NaOH. 26.2 Parts by weight of 1,1,2,2-tetrahydroperfluorohexyl chloroformic acid ester of the formula $C_4F_9CH_2CH_2OCOCl$ and 40 parts by volume of 2N—NaOH were added dropwise at room temperature, while stirring, in a pH-range of 9 to 11, within 1½ hours. The whole was then stirred for 1 hour at room temperature and for 30 minutes at 60°C. 134 Parts by weight of a clear aqueous solution containing 27.5% by weight of solid substance were obtained in an almost quantitative yield.

A part of the solution was evaporated on a steam bath. The residue was recrystallized from i-propanol.
$C_4F_9CH_2CH_2OCONHCH_2CH_2S_2O_3Na$ Mp. (dec.) 129° – 130° C.

2a. 15.7 Parts by weight of amino-ethane-thiosulfate were introduced into 50 parts by volume of 2N—NaOH. Then, 43.2 parts by weight of perfluoro-octanic acid chloride and 50 parts by volume of 2N—NaOH were added slowly and simultaneously, at room temperature (preponderantly at pH 10). Since the batch had become too thick owing to the crystallized reaction product, 200 parts by volume of water were added. The whole was then stirred for 2 hours at room temperature. 414 Parts by weight of a homogenous paste of about 40% strength were obtained. 32 Parts by weight of solid substance were isolated over a pressure filter. After recrystallization from methanol, an analytically pure product was obtained.
$C_7F_{15}CONHCH_2CH_2S_2O_3Na$ Mp.(dec.) 197° – 200° C.
Found: 11.1% S. Calc. 11.1% S.

b. The reaction was easier to carry out when using the perfluoro-octanic acid methyl ester of the formula $C_7F_{15}COOCH_3$ as the acylating agent.

41.5 Parts by weight of perfluoro-octanic acid methyl ester were added dropwise within 30 minutes at an internal temperature not exceeding 30°C to a suspension of 17.3 parts by weight of sodium amino-ethanol-sulfonic acid in 84.5 parts by weight of methanol, and the whole was then stirred for 30 minutes at room temperature. The crystal magma so obtained was then converted into a clear solution by heating to 70°C and solidified upon cooling to a 39.4% paste of $C_{17}F_{15}CONHCH_2CH_2S_2O_3Na$. This paste could be directly used as emulsifier in the polymerization process.

c. In a manner analogous to that described under a), but at a reaction temperature of +5°C there was obtained, when using perfluoro-octyl-sulfonic acid chloride, the sodium salt of perfluorooctyl-sulfonamido-ethyl-thiosulfuric acid of the formula $C_8F_{17}SO_2NHCH_2CH_2S_2O_3Na$.

3. 31.9 Parts by weight of tetrahydro-perfluorodecyloxycarbamidotoluyl-isocyanate (melting point 62° – 64°C, obtained by the reaction of 1 mol of 1,1,2,2,tetrahydro-perfluorodecanol with 1 mol of toluylene-di-isocyanate) were dissolved in 15 parts by volume of acetone and added dropwise, at 0° – 5°C, within about 20 minutes to a solution of 7.85 parts by weight of aminoethyl-thiosulfate in 50 parts by volume of 1N-NaOH. For better mixing, the whole was diluted with 17 parts by volume of acetone and 20 parts by volume of water, stirred for 2 hours at room temperature then filtered while hot to remove a small quantity of deposits. The filtrate was evaporated under reduced pressure and the residue was recrystallized from methanol.

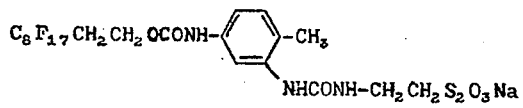

Melting point (decomposition) from 175°C on.

4a. 25.6 Parts by weight of 1,1,2,2,tetrahydro-perfluorodecyl-iodide were boiled for 20 hours on a reflux condenser with 11.5 parts by weight of $Na_2S_2O_3X\ 5H_2O$ in 30 parts by volume of methanol. The precipitate which crystallized upon cooling was filtered off with suction and recrystallized from methanol.

$C_8F_{17}CH_2CH_2S_2O_3Na$ Mp. (dec.) from 136° C on.
Found: 11.0 % S, Calc: 11.0 % S b. When reacting, under the same conditions, 9-trifluoromethyl-1,1,2,2,-tetrahydro-perfluorodecyl-iodide, there was obtained in a good yield the

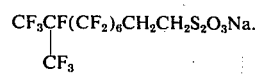

5. The 3-chloro-2-hydroxypropyl ether of 1,1,2,2,-tetrahydroperfluorooctanol (boiling point $_{0.3}$90° to 93°C, obtained from tetrahydroperfluro-octanol and epichlorohydrin with $BF_3$-catalysis) yielded, when boiled in methanol with $Na_2S_2O_3.5H_2O$ and catalytic amounts of NaI, the sodium salt of 3-tetrahydro-perfluoro-octyloxy-2-hydroxy-propane-thiosulfuric acid of the formula $C_6F_{13}CH_2CH_2OCH_2CHOHCH_2S_2O_3Na$. Melting point 125 - 130°C, after recrystallization from i-propanol.

| Found: 11.8 % S | Calc: 11.5 % S |
| --- | --- |
| 1.9 % H | 1.8 % S |
| 24.0 % C | 23.8 % C |

6. 11.4 Parts by weight of $Na_2S_2O_3 \times 5H_2O$, 3 parts by weight of crystallized sodium acetate, 2 parts by weight of sodium carbonate and 10 parts by volume of acetone were introduced, while well stirring, at room temperature, into 50 parts by weight of water. Then, 17 parts by weight of 1,1,2,2,4,4-hexahydro-3-oxa-perfluoro-undecyl-chloromethylether of the formula $C_7F_{15}CH_2OCH_2CH_2$-$OCH_2Cl$ were added in one portion. After 25 minutes, the whole was heated to 50°C. One-half hour later 40 parts by volume of acetone were added, the mixture was cooled and the acetone phase was separated. After evaporation of the acetone, the residue so obtained was washed, while still hot, with trichloro-trifluoro-ethane. There were obtained 6.4 parts by weight of $C_7F_{15}$—$CH_2$—$O$—$CH_2CH_2O$—$CH_2$-$S_2O_3Na$ having a melting point (decomposition) starting from 145°C with yellowing from 110°C.

Determination of S according to Epton (D. Hummel, Analyse der Tenside, Munchen 1962, page 187): found 5.1%, calc. 5.4%.

7. 4.71 Parts by weight of $H_3{}^+N$-$CH_2CH_2S_2O_3{}^-$ were dissolved in 15 parts by volume of 2N-methanolic sodium hydroxide solution. 9.4 Parts by weight of 3,4-bis-perfluoro-octoylamido-phenyl-isocyanate were added in small portions within 1 hour at 0°C. The whole was then stirred for 2 hours at 0°C and for 3 hours at room temperature. After dilution with 10 parts by volume of methanol, a solution of 3 parts by volume of methylformate in 10 parts by volume of methanol was added dropwise. The whole was allowed to stand overnight, then filtered with suction and washed with methanol. After drying under reduced pressure, 11.46 parts by weight of Bunte salt melting at 211° – 215°C (decomposition) were obtained. After recrystallization the melting point rose to 216°C (decomposition).

$C_7F_{15}$—CO—NH  
$C_7F_{15}$—CO—NH—⟨phenyl⟩—NH—CO—NH—$CH_2CH_2S_2O_3Na$ $C_{25}H_{11}F_{30}N_4O_6S_2Na$    Molecular weight 1120

| Calc.: | Found: |
|---|---|
| 26.8 % C | 26.3 % C |
| 0.9 % H | 1.2 % H |
| 5.0 % N | 5.1 % N |
| 5.7 % S | 5.8 % S |
| 2.1 % Na | 2.2 % Na |

8. 13.64 Parts by weight of $Na_2S_2O_3 \cdot 5 H_2O$, 3 parts by weight of crystallized sodium acetate and one part by weight of sodium-hydrogeno-carbonate were introduced into 30 parts by weight of water and one part by weight of acetone. 20.6 Parts by weight of tetrahydro-perfluorooctyl-chloromethyl ether of the formula $C_6F_{13}CH_2CH_2OCH_2Cl$ were added in one portion, while stirring vigorously. After having allowed the whole to stand for one hour at room temperature, 2 parts by weight of sodium carbonate and 30 parts by weight of water were added, and the whole was heated to 50°C. The reaction mixture was then stirred for 2 hours, 40 parts by weight of acetone were added and the mixture was again stirred for ½ hour at 15°C. After cooling, the layer of acetone was separated and the acetone was removed by distillation under reduced pressure. The residue so obtained was washed with diethyl ether, while still hot. After drying, the residue was again taken up in acetone and after removal by filtration of a minor residue, evaporated under reduced pressure. 4.4 Parts by weight of $C_6F_{13}CH_2CH_2OCH_2S_2O_3Na$ were obtained after recrystallization from acetone; melting point (decomposition): 161 – 164°C.

Determination of S according to Epton: (D. Hummel, Analyse der Tenside, Munich 1962, page 187). Found: 6.1%. calc. 6.25%.

9. 3 Parts by weight of chloro-acetic acid-N-dihydro-perfluorooctylamide were heated with 2.32 parts by weight of $Na_2S_2O_3 \times 5 H_2O$ and 0.05 part by weight of KI in a mixture of 10 parts by volume of alcohol and 10 parts by volume of water for 6 hours to reflux temperature. After evaporation, the residue was washed, while still hot, with diethyl ether and boiled with 150 parts by volume of acetone. The acetone filtrate was evaporated and the residue so obtained was recrystallized from alcohol. 2.6 Parts by weight of $C_7F_{15}CH_2NHCOCH_2$-$S_2O_3Na$ melting from 161°C onwards (decomposition) were obtained.

Determination of S according to Epton: found: 5.48%. calc. 5.55%.

10. 5.85 Parts by weight of $C_8F_{17}SO_2N(C_3H_7)CH_2C$-$H_2OH$ (prepared according to DAS 1,106,960) were dissolved in 5 parts by weight of acetone at 0° to 5°C. After addition of 3 parts by weight of phosgene, the whole was stirred for 1 hour at room temperature. Then, the acetone and the excess phosgene were removed by distillation under reduced pressure at room temperature. The residue contained 5.35% of Cl (cal: 5.5%). It was dissolved without purification in 3 parts by weight of acetone and then added at the same time with 5 parts by volume of 2N—NaOH, at 0° – 5°C to a solution of 1.57 g of aminoethyl-thiosulfate in 10 parts by volume of 1N-NaOH, which had been diluted with 10 parts by weight of acetone. The whole was stirred for 1 hour at 5°C for 2 hours at room temperature and for 30 minutes at 55°C. After cooling, a clear solution of $C_8F_{17}SO_2N(C_3H_7)CH_2CH_2OCONHCH_2CH_2$—$S_2O_3Na$ was obtained. Upon titration of the active sulfur according to Epton, 0.7% of sulfur were found which corresponded to a yield of about 85% of the theory and to a content of active solid substance in the solution of 17.3% by weight.

*) DAS = German Auslegeschrift 11. 16.4 Parts by weight of tetrahydro-perfluorodecylsulfur chloride of the formula $C_8F_{17}CH_2CH_2SO_2Cl$, dissolved in 12 parts by weight of acetone, and 15 parts by volume of 2N—NaOH were added dropwise, while well stirring at 0° – 5°C to a solution of 4.7 parts by weight of aminoethyl-thiosulfate in 15 parts by volume of 2N—NaOH, 25 parts by weight of water and 16 parts by weight of acetone. During the reaction, the pH-value was kept at 11.5. Stirring was continued for 1 hour at room temperature and for 30 minutes at 55°C. After cooling, the reaction product was filtered off with suction. The residue consisted of 15 parts by weight of $C_8F_{17}CH_2CH_2SO_2NHCH_2CH_2S_2O_3Na$ having a melting point of 245°C (decomposition). By concentration of the filtrate, further 3.5 parts by weight of the substance were obtained.

B. EXAMPLES OF POLYMERIZATION:

1. 5 Parts by weight of $C_6F_{13}CH_2CH_2OCOCH=CH_2$, 5 parts by weight of $C_8F_{17}CH_2CH_2OCOCH=CH_2$, 0.5 parts by weight of $C_8F_{17}CH_2CH_2S_2O_3Na$, 0.05 part by weight of borax, 0.4 part by weight of acrylamide, 6 parts by volume of acetone and 20.4 parts by weight of water were stirred at 50°C under an atmosphere of nitrogen. After 30 minutes, the polymerization was initiated by the addition of 0.03 part of $Na_2S_2O_5$ and 0.08 part of $K_2S_2O_8$. After 5 hours at 50°C an almost water-clear emulsion containing 28.4% of solid substance.

In the following polymerization examples, the same conditions have been maintained with the exception that only the emulsifier has been varied. When cation-active emulsifiers were used, azo-di-isobutyroamidinium-chlorohydrate was employed as the polymerization initiator and the polymerization was carried out at 65°C.

| | | |
|---|---|---|
| 2) | Emulsifier | $C_6F_{13}CH_2CH_2OCONHCH_2CH_2S_2O_3Na$ |
| 3) | " | $C_8F_{17}CH_2CH_2OCONHCH_2CH_2S_2O_3Na$ |
| 4) | " | $C_7F_{15}CONHCH_2CH_2S_2O_3Na$ |
| 5) | " |  |
| 6) | " | Laurylsulfate |
| 7) | " | $C_7F_{15}CONH(CH_2CH_2O)_{25}H$ |
| 8) | " | $C_{16}H_{33}\overset{\oplus}{N}(CH_3)_3\overset{\ominus}{Cl}$ |
| 9) | " | $C_6F_{13}CH_2CH_2OCONHCH_2CH_2CH_2N(CH_3)_2 \times HCl$ |
| 10) | " | $C_7F_{15}CONH(CH_2CH_2O)_{11}SO_3Na$ |
| 11) | " | $C_6F_{13}CH_2CH_2OCONHCN_2CH_2OSO_3Na$ |

In Examples B 2 to B 11 emulsions were obtained which had the same external properties as that of Example B I.

12. 5 Parts by weight of

$C_6F_{13}CH_2CH_2OCOC=CH_2$, 0.25 parts by weight of $C_7F_{15}CONHCH_2CH_2S_2O_3Na$, 0.2 parts by weight of acrylamide, 4 parts by volume of acetone, 12 parts by weight of water and 0.2 parts by volume of tri-ethylamine were stirred at 50°C under an atmosphere of $N_2$. After 15 minutes, polymerization was started with 0.05 part by weight of $K_2S_2O_8$; it was completed after 4 hours.

13. 10 Parts by weight of $C_7F_{15}CH_2OCOCH=CH_2$, 0.5 part by weight of $C_6F_{13}CH_2CH_2OCONHCH_2CH_2S_2O_3Na$, 0.1 part by weight of borax, 0.4 part by weight of acrylamide, 6 parts by volume of acetone and 21 parts by weight of water were stirred for 30 minutes at 50°C under an atmosphere of $N_2$. The polymerization was initiated by the addition of 0.03 part by weight of $Na_2S_2O_5$ and 0.07 part by weight of $K_2S_2O_8$ and was completed after 6 hours.

Also with this monomer $C_7F_{15}CH_2OCOCH=CH_2$ a test series with different emulsifiers was carried out according to the conditions of Example B 13.

| | | |
|---|---|---|
| 14) | Emulsifier | $C_7F_{15}OCONHCH_2CH_2S_2O_3Na$ |
| 15) | " | $C_8F_{17}CH_2CH_2OCONHCH_2CH_2S_2O_3Na$ |
| 16) | " | $C_8F_{17}CH_2CH_2S_2O_3Na$ |
| 17) | " | $C_7F_{15}CONHCH_2CH_2S_2O_3Na$ |
| 18) | " | $C_6F_{13}CH_2CH_2OCONHCH_2CH_2OSO_3Na$ |
| 19) | " | $C_6F_{13}CH_2CH_2OCONHCH_2CH_2CH_2\overset{+}{N}(CH_3)_2 \times \overset{-}{H}Cl$ |
| 20) | " | $C_{16}H_{33}N(CH_3)_3Cl$ |
| 21) | " | 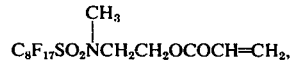 |
| 22) | " | $C_6F_{13}CH_2CH_2OCH_2CHOHCH_2S_2O_3Na$ |
| 23) | " | $C_7F_{36}CONH(CH_2)_3N\genfrac{}{}{0pt}{}{\diagup CH_3}{\diagdown CH_3} \times CH_3COOH$ |

24. 10 Parts by weight of $$C_8F_{17}SO_2\underset{\underset{CH_3}{|}}{N}CH_2CH_2OCOCH=CH_2,$$

0.5 part by weight of the mixture of emulsifiers described in Example A 1c, 0.1 part by weight of borax, 0.4 part by weight of methylol-acrylamide, 6 parts by volume of methylalcohol and 21 parts by weight of water were stirred for 30 minutes at 40°C in an atmosphere of nitrogen. The initiators of the polymerization used were 0.06 part by weight of $K_2S_2O_8$ and 0.04 part by weight of $Na_2S_2O_5$. The polymerization was completed after 6 hours at 40°C.

25. 10 Parts by weight of $C_7F_{15}CH_2NHCOCH=CH_2$ were polymerized under the same conditions as those described in Example B 23.

26. 10 Parts by weight of $C_7F_{15}CONHCH_2CH_2OCOCH=CH_2$ were likewise polymerized according to the process described in Example B 24.

27. 10 Parts of $C_6F_{13}CH_2CH_2OCOCH=CH_2$, 10 parts of $C_8F_{17}CH_2CH_2OCOCH=CH_2$, 6 parts of $C_{10}F_{21}CH_2CH_2OCOCH=CH_2$, 1.5 parts of the emulsifier mixture described in Example A 1c, 0.2 part of borax, 16.2 parts of a 5% polyacryl-amide solution, 11.8 parts of acetone, 35 parts by weight of water and 0.05 part by weight of $Na_2S_2O_5$, were stirred for 30 minutes, at 50°C, under an atmosphere of nitrogen in a heatable stirring vessel provided with an outlet. About ⅓ of this monomer pre-emulsion was allowed to run into a polymerization vessel placed below the above vessel. The polymerization was initiated by the addition of 0.03 part of $K_2S_2O_8$. 5 Minutes later, the remaining pre-emulsion and, separately, 0.07 part by weight of $K_2S_2O_8$ (dissolved in 3.5 parts of $H_2O$) were added dropwise in the course of 1½ hours. Duration of the polymerization: 5 hours. An almost water-clear emulsion containing only traces of a coagulation product was obtained.

C. APPLICATION EXAMPLES:

1. Fluoroacrylate polymer dispersions, prepared according to the methods described in Examples B 1 – 11, were diluted with water to a fluorine content of 0.22%. For the finishing of cotton poplin, these baths having a fluorine content of 0.22% additionally contained 50 g of dimethylol-dihydroxyethylene-urea and 30 g of $MgCl_2 \times 6 H_2O$ per liter. The pH-value was adjusted to 5 by means of dilute acetic acid, the squeezing effect was 90%. The tissue samples were dried at 100°C and then hardened for 5 minutes at 160°C. The oil repellent effect was determined after 5 washings in a household washing machine.

| Polymer dispersions from Example | At the beginning | Oil repellent effect after 5 washings with a washing machine | |
|---|---|---|---|
| B 1 | 130 | 80 | |
| B 2 | 130 | 80 | |
| B 3 | 130 | 80 | emulsifiers of the invention |
| B 4 | 130 | 80 | |
| B 5 | 130 | 80 | |
| B 8 | 120 | 80 | cation-active emulsifiers |
| B 9 | 120 | 50 | |
| B 6 | 120 | 50 | |
| B 7 | 110 | 0 | anion-active and non-ionic emulsifiers |
| B 10 | 120 | 50 | |
| B 11 | 120 | 50 | |

Accordingly, the fluorine-containing Bunte salt emulsifiers gave a better resistance to washing of the oleophobic finish than the dispersions which had been produced with anionic or non-ionic emulsifiers.

2. As described in Example C 1, several fluoro-acrylate polymer dispersions were diluted with water to a fluorinecontent of 0.22% and adjusted to a pH-value of 5 by means of dilute hydrochloric acid. Polyester fabrics (terephthalic acid-polyglycol ester) were treated with these dispersions, squeezed to a liquor uptake of 90% and dried at 100°C. After determination of the oil repellent effect, the polyester samples were stirred for 15 minutes at room temperature in a bath containing oily dirt. This bath contained 1 g of used-up motor oil, 0.25 g of alkanesulfonate and 1.2 g of carboxymethyl cellulose per 400 ml of water.

| Polymer dispersion | Oil repellent effect | Soiling |
|---|---|---|
| B 15 | 130 | pract. none |
| B 16 | 130 | pract. none |
| B 27 | 130 | pract. none |
| B 19 | 130 | distinct soiling |
| B 20 | 130 | strong soiling |
| B 23 | 130 | distinct soiling |

This Table shows the superiority of the dispersions prepared with fluorine-containing Bunte salt emulsifiers with regard to the soil repellent effect to those prepared with cation-active emulsifiers.

3. Samples of mixed fabrics (polyester/cotton) were impregnated in a manner analogous to that described in Examples (1) and (2) with fluoroacrylate-polymer dispersions which had been adjusted to a fluorine-content of 0.22% and to a pH-value of 3 (by means of dilute HCl) and which additionally contained, per liter, 50 g of dimethylol-dihydroxyethylene-urea and 30 g of $MgCl_2 \times 6 H_2O$. After squeezing (90% uptake) the samples were dried at 100°C. The fabric samples were then stirred for 5 minutes at room temperature in a bath containing oil dirt (composition: 2 g of used-up motor oil, 0.5 g of alkane sulfonate, 1.2 g of carboxymethyl cellulose in 400 g of water).

| Polymer dispersions | Oil repellent effect | Soiling |
|---|---|---|
| B 1 | 130 | slight soiling |
| B 3 | 130 | slight soiling |
| B 4 | 130 | slight soiling |
| B 5 | 130 | slight soiling |
| B 8 | 130 | stronger soiling |
| B 9 | 130 | stronger soiling |

Even here the lower tendency to soiling of the new dispersions could be noted.

4. The advantageous dirt-repellent properties of the new dispersions could also be stated when soiling cotton poplin which had been provided with a finish according to Example C 1. Thus, for example fabrics which had been impregnated with the dispersions B 21 and B 27 showed, after a treatment with the above-described bath containing oily dirt, a lower dirt retention than fabrics that had been impregnated with the dispersions B 19 and B 20, although all 4 samples had the same oil repellent value of 130.

1. A compound of the formula $$X-C_aF_{2a}-V-S_2O_3-M$$

in which X is hydrogen or fluorine, a is a number from 4 to 14, V is a bivalent radical which contains at least one but not more than a methylene groups and which does not contain in the terminal position related to the thiosulfato group an ethylene group activated by a sulfonyl or carbonyl group, V having the formula $$-(CHR')_b-(O)_c-(Z)_d-NR-(CH_2)_g-$$

in which b is 0, 1 or 2, c is 0 or 1, d is 1, g is a number of 1 to 12, R and R' are hydrogen or lower alkyl, Z is $-CO-$, and M is an alkali metal ion.

2. A compound as claimed in claim 1, wherein R' is hydrogen.

3. A compound as claimed in claim 1, wherein R is hydrogen.

4. A compound as claimed in claim 1, wherein g is 1 or 2.

5. A compound of the formula $$X-C_aF_{2a}-(CHR)_b-CONR-(CH_2)_g-S_2O_3M$$

in which X is hydrogen or fluorine, a is a number from 4 to 14, R is hydrogen or lower alkyl, M is an alkali metal ion, b is 0.1 or 2 and g is a number of 1 to 12.

6. The compound of the formula $$F-C_aF_{2a}-CO-NH\ CH_2CH_2S_2O_3M$$

wherein a is 7 and M is sodium.

* * * * *